US011110358B2

(12) United States Patent
Ohashi

(10) Patent No.: US 11,110,358 B2
(45) Date of Patent: Sep. 7, 2021

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Yuji Ohashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 69 days.

(21) Appl. No.: 16/550,544

(22) Filed: Aug. 26, 2019

(65) Prior Publication Data

US 2020/0061474 A1 Feb. 27, 2020

(30) Foreign Application Priority Data

Aug. 27, 2018 (JP) .............................. JP2018-158300

(51) Int. Cl.
*A63F 13/00* (2014.01)
*A63F 9/24* (2006.01)
*A63F 13/822* (2014.01)
*A63F 13/58* (2014.01)

(52) U.S. Cl.
CPC ............ *A63F 13/822* (2014.09); *A63F 13/58* (2014.09)

(58) Field of Classification Search
CPC .......... A63F 13/55; A63F 13/58; A63F 13/60; A63F 13/67; A63F 13/69; A63F 13/822; A63F 13/825
See application file for complete search history.

(56) References Cited

U.S. PATENT DOCUMENTS

| | | | |
|---|---|---|---|
| 2005/0221880 A1* | 10/2005 | Kando ................. | A63F 13/822 463/9 |
| 2011/0034245 A1* | 2/2011 | Mimura ................ | A63F 13/812 463/31 |
| 2011/0244957 A1* | 10/2011 | Nishimura .......... | A63F 13/5258 463/31 |

OTHER PUBLICATIONS

"Skylanders: Spyro's Adventure Explained" by GirlGamerTV. YouTube—Broadast Yourself. [dated Aug. 12, 2011], [online], [retrieved on Jan. 29, 2021]. <URL:https://www.youtube.com/watch?v=Zp7zi_gW3_U>. 3 Pages. (Year: 2011).*

(Continued)

*Primary Examiner* — Milap Shah
(74) *Attorney, Agent, or Firm* — Nixon & Vanderhye PC

(57) ABSTRACT

If an update condition is satisfied in a battle game, a replacement process including a process of erasing a player's unit included in a first player's group from a battle field while maintaining a position of an enemy unit on the battle field, and a process of placing a player's unit included in a second player's group on the battle field is performed, and a battle game where the player's unit and the enemy unit after the replacement process are caused to battle against each other in accordance with a positional relationship on the battle field is continued.

17 Claims, 10 Drawing Sheets

(56) References Cited

OTHER PUBLICATIONS

"I died now what? Skylanders: Spyro's Adventure"—GameFAQs.com. [online], [retrieved on Jan. 29, 2021]. <URL:https://gamefaqs.gamespot.com/wii/622840-skylanders-spyros-adventure/answers/308264-i-died-now-what>. 4 Pages. 2012. (Year: 2012).*

"Skylanders: Spyro's Adventure" From Wikipedia.org [dated Oct. 24, 2017], [online], [retrieved on Jan. 29, 2021]. <URL:https://web.archive.org/web/20171024100736/https://en.wikipedia.org/wiki/Skylanders:_Spyro's_Adventure>. 8 Pages. (Year: 2017).*

[Online] "Fire Emblem Heroes Nintendo Topics", Nintendo Co., Ltd.—searched Aug. 14, 2018, printed on Aug. 26, 2019, URL: https://fire-emblem-heroes.com/en/topics/index.html?id=detail-20170630, 102 pages.

* cited by examiner

F I G. 1
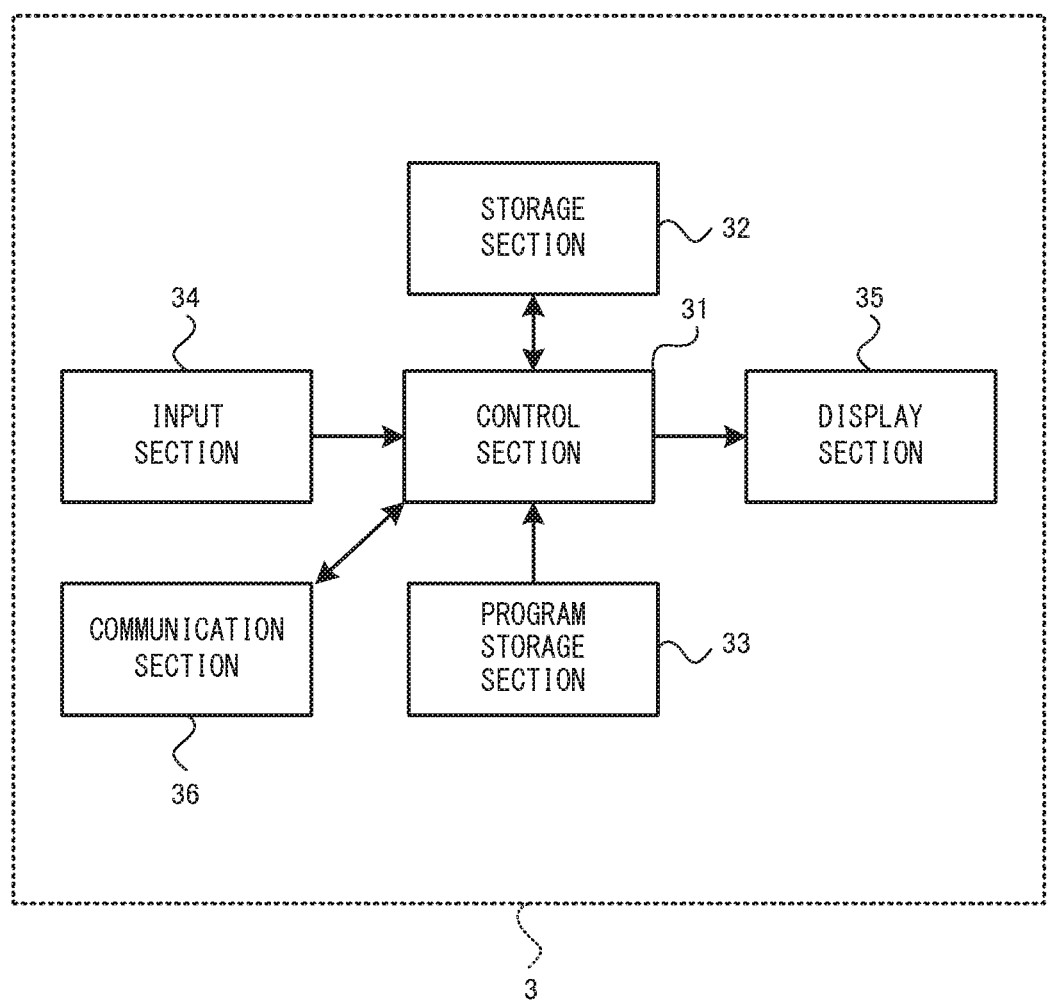

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2018-158300, filed on Aug. 27, 2018, is incorporated herein by reference.

FIELD

The technology shown here relates to a storage medium having stored therein an information processing program, an information processing apparatus, an information processing system, and an information processing method, and in particular, relates to, for example, a storage medium having stored therein an information processing program, an information processing apparatus, an information processing system, and an information processing method for performing game processing.

BACKGROUND AND SUMMARY

Conventionally, there is a game program in which a game composed of a plurality of maps is executed, and when a battle on a certain map is won, game processing for enabling the game to proceed to a battle on a next map is performed. In the game program, when the game proceeds to the battle on the next map, a character used on a map in the past cannot be used again.

In the game obtained by executing the game program, however, battles using the respective maps are independent of each other. Thus, there is room for improvement in interest due to the fact that characters cooperate to compete.

Therefore, it is an object of an exemplary embodiment to provide a storage medium having stored therein an information processing program, an information processing apparatus, an information processing system, and an information processing method that are capable of improving the interest of a user in a game where a plurality of game units such as characters are caused to appear.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a storage medium having stored therein an information processing program according to the exemplary embodiment, an information processing program is executed by a computer of an information processing apparatus. The information processing program causing the computer to execute: setting a plurality of player's groups each including at least one player's unit; placing a player's unit included in a first player's group and an enemy unit on a battle field in a virtual space, the first player's group being among the plurality of player's groups; executing a battle game where at least one of battle units including the player's unit and the enemy unit are moved on the battle field, and the player's unit and the enemy unit are caused to battle against each other in accordance with a positional relationship on the battle field; measuring the number of elapsed turns or in-game time in the battle game; if the number of elapsed turns or the in-game time satisfies an update condition in the battle game, performing a replacement process including a process of erasing at least one player's unit included in the first player's group from the battle field while maintaining a position of the enemy unit on the battle field, and the process of placing a player's unit included in a second player's group among the plurality of player's groups on the battle field; and continuing a battle game where the player's unit and the enemy unit after the replacement process are caused to battle against each other in accordance with the positional relationship on the battle field.

Based on the above, in a game where a player's unit and an enemy unit compete against each other in accordance with a positional relationship on a battle field, a plurality of player's groups including a player's unit can be organized, and each player's group can be sequentially caused to appear on the battle field and used. Thus, it is possible to improve interest in a battle game.

Further, the update condition may be satisfied every time the number of elapsed turns or game time determined in advance elapses.

Based on the above, a condition for replacing a player's group is determined in advance, thereby creating the level of strategy in the battle game.

Further, when all the battle units placed on the battle field perform actions, a single turn may elapse.

Based on the above, based on the fact that all units that appear in the battle game perform actions, a condition for replacing a player's group can be determined.

Further, when all the player's units placed on the battle field perform actions, a single turn may elapse.

Based on the above, based on the fact that a player's unit that appears in the battle game performs an action, a condition for replacing a player's group can be determined.

Further, the battle unit may attack another battle unit in the battle game, thereby changing a first parameter of the other battle unit, and if the first parameter of the other battle unit satisfies a first parameter condition, the other battle unit may be erased from the battle field.

Based on the above, an opponent unit can be erased from the battle field by an attack. Thus, the level of strategy in the battle game by attacking an opponent unit is created.

Further, if the update condition is satisfied, the player's unit included in the second player's group may be placed at or near an appearance position determined in advance on the battle field.

Based on the above, when a player's group is replaced, the player's group appears at or near an appearance position determined in advance. Thus, the level of strategy is created in a battle near the appearance position.

Further, when the player's unit included in the first player's group is first placed on the battle field, the player's unit may be placed at or near the appearance position.

Based on the above, each player's group is initially placed at or near an appearance position determined in advance. Thus, the level of strategy is created in a battle near the appearance position.

Further, if at least one defense unit is placed on the battle field and the update condition is satisfied, the placement on the battle field may be continued by maintaining a position of the defense unit at a time when the update condition is satisfied. The battle unit may attack the defense unit in the battle game, thereby changing a second parameter of the defense unit, and if the second parameter satisfies a second parameter condition regarding the at least one defense unit placed on the battle field, the battle game may be ended.

Based on the above, as the purpose of the battle game, it is possible to set the purpose of defending a defense unit placed on the battle field until the battle game ends.

Further, if the update condition is satisfied, the player's unit included in the second player's group may be placed at or near the position of the defense unit.

Based on the above, to defend the defense unit, it is possible to cause a new player's unit to appear at a suitable position.

Further, the position of the defense unit on the battle field may be fixed.

Based on the above, as the purpose of a battle game, it is possible to set the purpose of defending the defense unit fixedly placed on the battle field until the battle game ends.

Further, if the update condition is satisfied, all player's units placed on the battle field immediately before the replacement process is performed may be erased from the battle field.

Based on the above, in the battle game, it is possible to allow a user to use a large number player's units.

Further, the information processing program may further cause the computer to execute calculating a score in the battle game. In this case, if the update condition is satisfied, the score for calculating the score is determined in accordance with the number of the player's units placed on the battle field immediately before the replacement process is performed, and every time the update condition is satisfied, the score may be accumulated.

Based on the above, in accordance with the number of player's units remaining in the battle game, it is possible to earn a score in the battle game.

Further, the information processing program may further cause the computer to execute calculating a score in the battle game. In this case, if the second parameter of the defense unit satisfies the second parameter condition, the defense unit may be disabled on the battle field. When the battle game ends, the score for calculating the score may be determined in accordance with the number of the defense units remaining enabled on the battle field.

Based on the above, by defending the defense unit on the battle field in the battle game, it is possible to earn a score in the battle game.

Further, the score for calculating the score may be determined in accordance with the number of the enemy units erased from the battle field in the battle game.

Based on the above, in accordance with the number of enemy units defeated in the battle game, it is possible to earn a score in the battle game.

Further, a user may specify in which of the player's groups the player's unit is included.

Based on the above, it is possible to include a player's unit desired by a user in a player's group.

Further, in accordance with the number of elapsed turns or a lapse of the in-game time, the enemy unit may be additionally placed on the battle field.

Based on the above, in accordance with the number of elapsed turns or the lapse of in-game time, an enemy unit is reinforced on the battle field. Thus, it is possible to maintain a sense of tension of a user in the battle game.

Further, the exemplary embodiment may be carried out in the forms of an information processing apparatus, an information processing system, and an information processing method.

According to the exemplary embodiment, it is possible to improve interest in a game where a player's unit and an enemy unit compete against each other in accordance with a positional relationship on a battle field.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a block diagram showing a non-limiting example of the configuration of an information processing apparatus 3 according to an exemplary embodiment;

DETAILED DESCRIPTION OF NON-LIMITING EXAMPLE EMBODIMENTS

Figure 2:
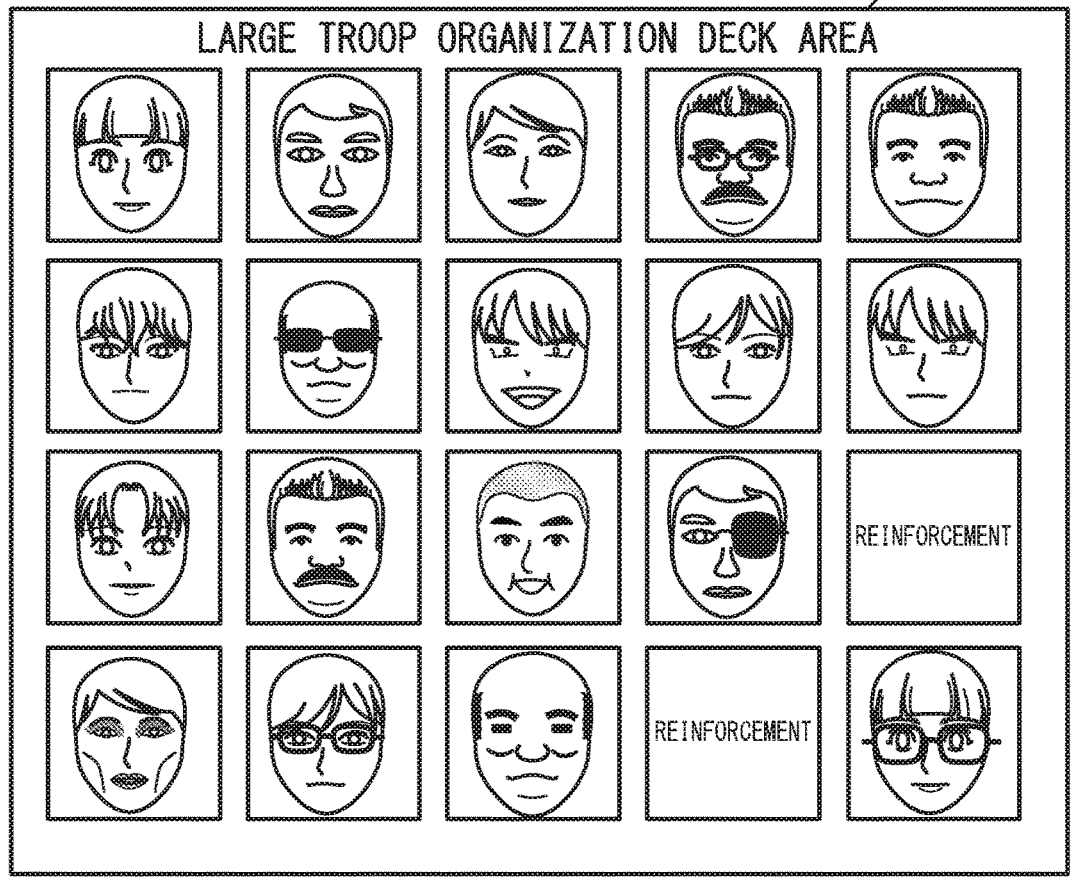
FIG. 2 is a conceptual diagram showing a non-limiting example of the process of organizing a large troop and configuring a sortie performed by the information processing apparatus 3.
Figure 2:
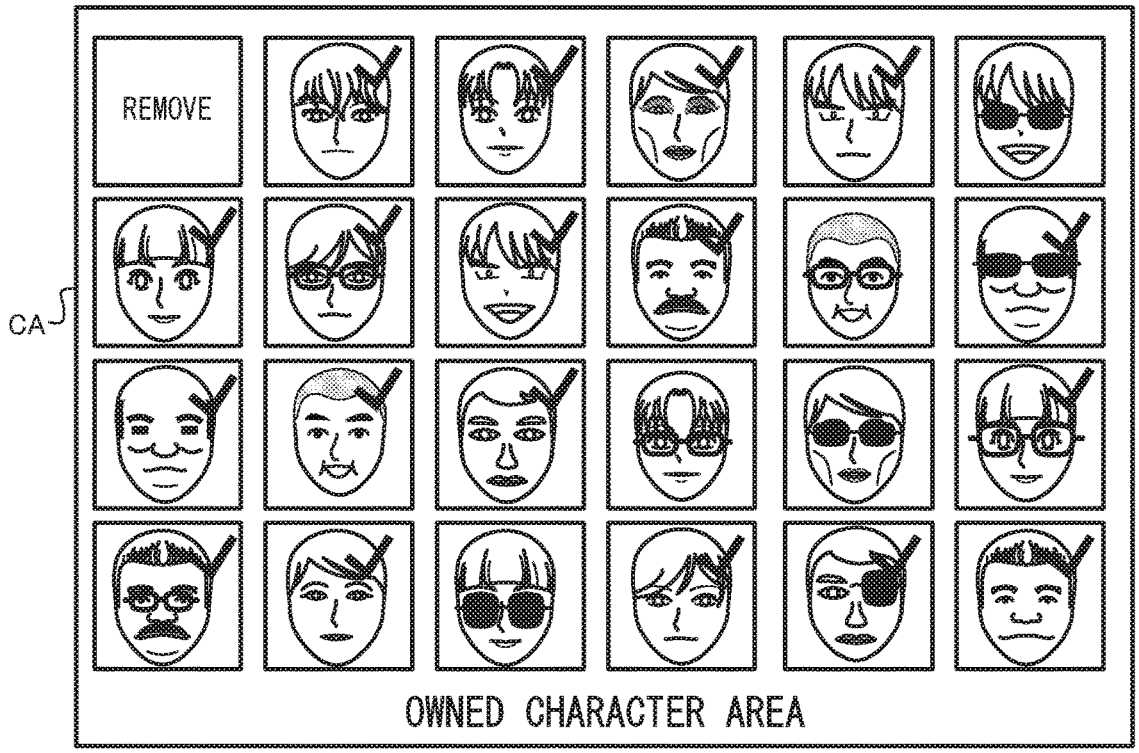

With reference to FIG. 1, a description is given of an information processing apparatus 3 according to an exemplary embodiment. FIG. 1 is a block diagram showing an example of the configuration of the information processing apparatus 3. It should be noted that the information processing apparatus 3 may be provided in the form of an information processing system where the information processing apparatus 3 communicates with another apparatus, for example, by constructing the information processing system by connecting a server to the information processing apparatus 3 via a network. Further, a single information processing apparatus 3 may be provided, or an information processing system 1 may be formed by connecting a plurality of information processing apparatuses 3. For example, the information processing apparatus 3 can execute a predetermined application (e.g., a game application). Further, the information processing apparatus 3 establishes a connection with another apparatus by executing the predetermined application and becomes able to communicate with the other apparatus. For example, the information processing apparatus 3 can execute an information processing program stored in an exchangeable storage medium such as a memory card or an optical disc or received from the other apparatus. The information processing apparatus 3 may be a device such as a general personal computer, a stationary game apparatus, a mobile phone, a mobile game apparatus, or a PDA (Personal Digital Assistant).

In FIG. 1, the information processing apparatus 3 includes a control section 31, a storage section 32, a program storage section 33, an input section 34, a display section 35, and a communication section 36. It should be noted that the information processing apparatus 3 may be composed of one or more apparatuses including: an information processing apparatus having at least the control section 31; and another apparatus.

The control section 31 is information processing means (a computer) for performing various types of information processing and is, for example, a CPU. For example, the control section 31 has the function of, as the various types of information processing, executing the application, thereby executing game processing described later, a data transmission/reception process, and the like. The functions of the control section 31 are achieved by, for example, the CPU executing a predetermined program.

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus having the control section 31, or may be a storage medium detachably attached to the information processing apparatus having the control section 31. Alternatively, the program storage section 33 may be a storage device (a server or the like) connected to the control section 31 via a network. The control section 31 (the CPU) may read a part or all of a game program to the storage section 32 at appropriate timing and execute the read program.

The input section 34 is an input apparatus that can be operated by a user. The input section 34 may be any input apparatus.

The display section 35 displays an image in accordance with an instruction from the control section 31. It should be noted that if the information processing apparatus 3 is composed of a stationary game apparatus or a personal computer, the display section 35 can be composed separately from the information processing apparatus 3.

The communication section 36 is composed of a predetermined communication module. The communication section 36 transmits and receives data to and from another device (e.g., a server) via a network, and transmits and receives data to and from another information processing apparatus 3 directly or via a network. For example, another apparatus capable of communicating with the information processing apparatus 3 may manage information regarding a character to be gained by the user and the purchase of an item. Further, when a predetermined login process is required to execute an application in the information processing apparatus 3, another apparatus may perform an authentication process for determining whether or not the user attempting to log in is an authorized user.

Figure 3:
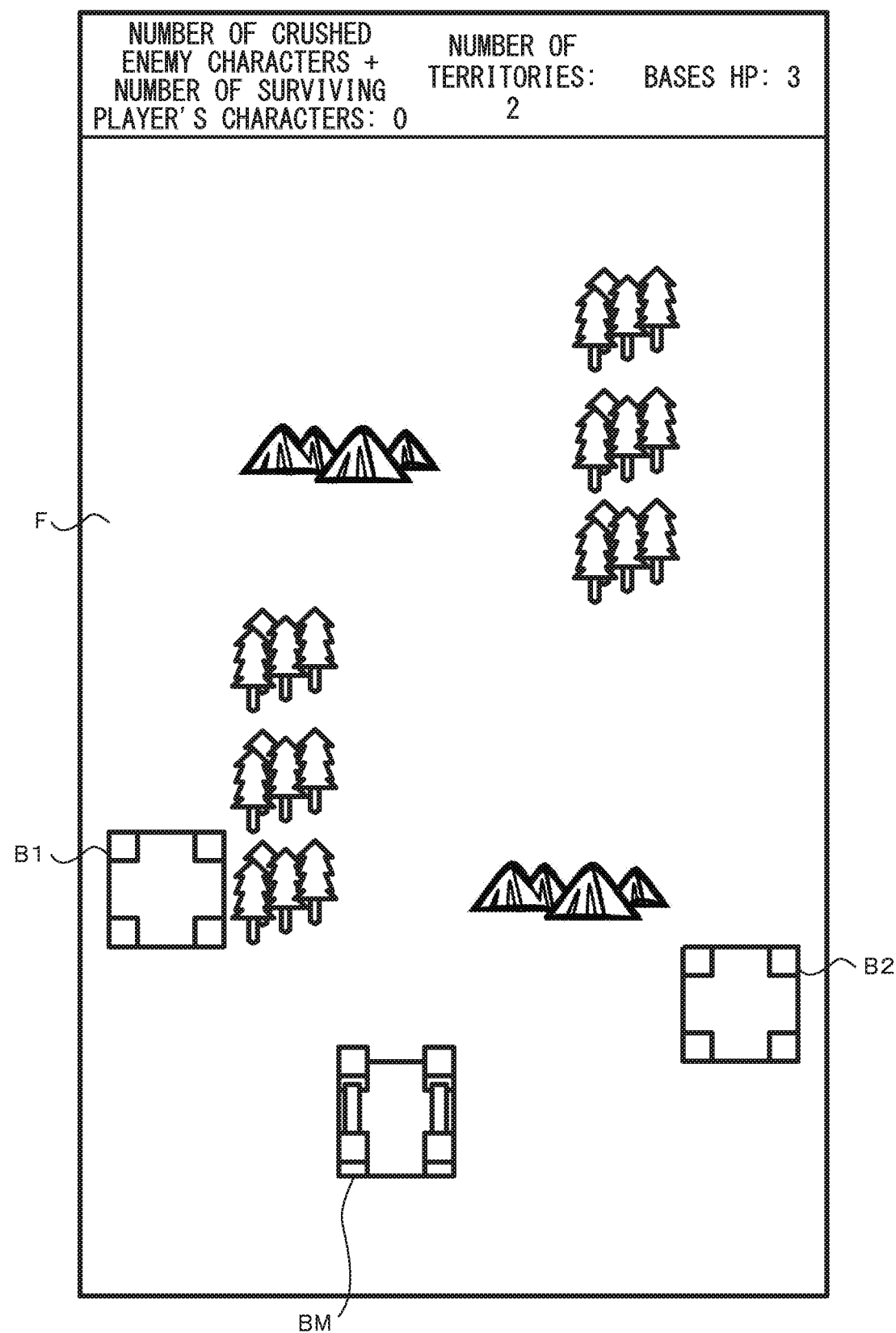
FIG. 3 is a diagram showing a non-limiting example of a battle field F displayed in a battle game performed by the information processing apparatus 3.

Next, with reference to FIGS. 2 to 7, a description is given of an overview of the processing performed by the information processing apparatus 3, before the description of specific processing performed by the information processing apparatus 3. It should be noted that FIG. 2 is a conceptual diagram showing an example of the process of organizing a large troop and configuring a sortie performed by the information processing apparatus 3. FIG. 3 is a diagram showing an example of a battle field F displayed in a battle game performed by the information processing apparatus 3. FIGS. 4 to 7 are diagrams showing examples of a game image displayed in the battle game performed by the information processing apparatus 3. It should be noted that the following descriptions are given using a game as an example of the application to be executed by the information processing apparatus 3. Alternatively, another application may be executed by the information processing apparatus 3.

With reference to FIG. 2, a description is given of an example of game processing performed by the information processing apparatus 3. In FIG. 2, in a game according to the exemplary embodiment, it is possible to cause a plurality of characters owned by the user to appear in the game and battle against enemy characters. For example, in accordance with an operation, the user can move any of a plurality of characters (player's characters) placed in an owned character area CA displayed on the display section 35 to a large troop organization deck area TA. In this example, in accordance with a user operation, it is possible to form a large troop including a plurality of (e.g., 20) player's characters in the large troop organization deck area TA. Then, it is possible to perform a game where the player's characters placed in the large troop organization deck area TA make a sortie and battle against enemy characters by performing a predetermined sortie operation. It should be noted that in another example, a game where all the player's characters owned by the user make a sortie and battle against enemy characters may be performed. It should be noted that in the exemplary embodiment, a player's character is used as an example of a player's unit that is one of battle units, and an enemy character is used as an example of an enemy unit that is the other of the battle units.

In the game according to the exemplary embodiment, the large troop formed in the large troop organization deck area TA is divided into a plurality of player's groups, and one of the plurality of player's groups sequentially makes a sortie, thereby battling against enemy characters. For example, when the large troop is formed of 20 player's characters, four player's groups (first to fourth player's groups) each including five player's characters are set in the large troop. It should be noted that the plurality of player's groups set in the large troop may be organized by a user operation, or may be randomly organized in the large troop by the control section 31. For example, when the plurality of player's groups are organized by a user operation, the plurality of player's groups may be organized in accordance with the positions of the player's characters placed in the large troop organization deck area TA by a user operation. As an example, the plurality of player's groups may be organized such that in a list of player's character groups formed in the large troop organization deck area TA, player's characters placed in the same row or the same column belong to the same group. Further, a configuration may be employed in which when the plurality of player's groups are organized by a user operation, a frame or the like with respect to each player's group may be displayed in the large troop organization deck area TA so that the user can recognize the placement locations of player's characters assigned to each player's group.

It should be noted that the characters owned by the user, i.e., the player's characters placed in the owned character area CA cannot doubly belong to different player's groups. Thus, the user can move a single player's character placed in the owned character area CA to a desired single place in the large troop organization deck area TA, but cannot simultaneously place the single player's character in a plurality of places in the large troop organization deck area TA (specifically, a plurality of places belonging to different player's groups). It should be noted that a configuration may be employed in which the same player's character can doubly belong to different player's groups. In this case, the user can simultaneously place the single player's character placed in the owned character area CA in the plurality of places in the large troop organization deck area TA.

Further, when an empty space where no player's character is placed remains in the large troop organization deck area TA, another character that is not placed in the large troop organization deck area TA by the user may become a reinforcement and be added as a player's character to this place. For example, the player's character to be added as a reinforcement may be randomly selected by the control section 31 from characters set in advance and may be added. Alternatively, the information processing apparatus 3 may communicate with another apparatus (e.g., another information processing apparatus 3 or a server), whereby the player's character to be added as a reinforcement may be extracted from characters owned by the other apparatus and may be added. Thus, even when the user does not own as many characters as can be set as a large troop in the large troop organization deck area TA, it is possible to prepare as many player's characters as can be set as the large troop and make a sortie.

Next, with reference to FIG. 3, a description is given of a battle field F displayed on the display section 35 in the battle game. As shown in FIG. 3, the battle field F is set as a game field where a plurality of player's characters (e.g., five player's characters) belonging to a single player's group selected from the large troop formed in the large troop organization deck area TA and a plurality of enemy characters compete against each other. Then, the battle field F is not changed to another battle field F until the battle ends or the winning or losing of the battle is determined.

On the battle field F, a plurality of player's strongholds are initially placed. For example, as the plurality of strongholds placed on the battle field F, a base BM and a player's territory B (a single base BM and two territories B1 and B2 in the example of FIG. 3) are set and all fixed on the battle field F. Then, the user defends the base BM and the player's territory B from the attack of enemy characters until the battle ends, thereby acquiring a predetermined score. Here, the score of this battle is a value for clearing the battle game and obtaining a reward as described later. The value satisfies a target value, whereby the user can obtain a reward. Further, when the player's base BM is destroyed by the attack of enemy characters and disappears (e.g., when a parameter (hit points) set for the base BM becomes 0), the battle ends, and the winning or losing of the user is determined based on the score at the time of the end. It should be noted that as another example, when the base BM and the player's territory B are all destroyed by the attack of enemy characters and disappear (e.g., when parameters (hit points) set for the base BM and the territory B all become 0), the battle may end. Further, at least one of the player's strongholds may be configured to be movable on the battle field F. In this case, the movable stronghold may function as a movable weapon or facility on the battle field F. It should be noted that in the exemplary embodiment, a base and a territory are used as examples of a defense unit, hit points are used as an example of a second parameter of the defense unit, and the hit points becoming 0 is used as an example of a second parameter condition.

Next, with reference to FIGS. 4 to 7, a description is given of an example of a battle between player's characters and enemy characters. As shown in FIGS. 4 to 7, in the exemplary embodiment, a battle game between player's characters and enemy characters is performed based on a turn system where a player turn (a player's turn) in which the user operates player's characters and an opponent turn (an enemy turn) in which a computer as an opponent controls enemy characters to perform actions are alternately repeated. For example, by operating the input section 34 during a player turn, the user can operate a plurality of player's characters placed on the battle field F, and the battle field F viewed from an overhead viewpoint is displayed on the display section 35.

Figure 4:
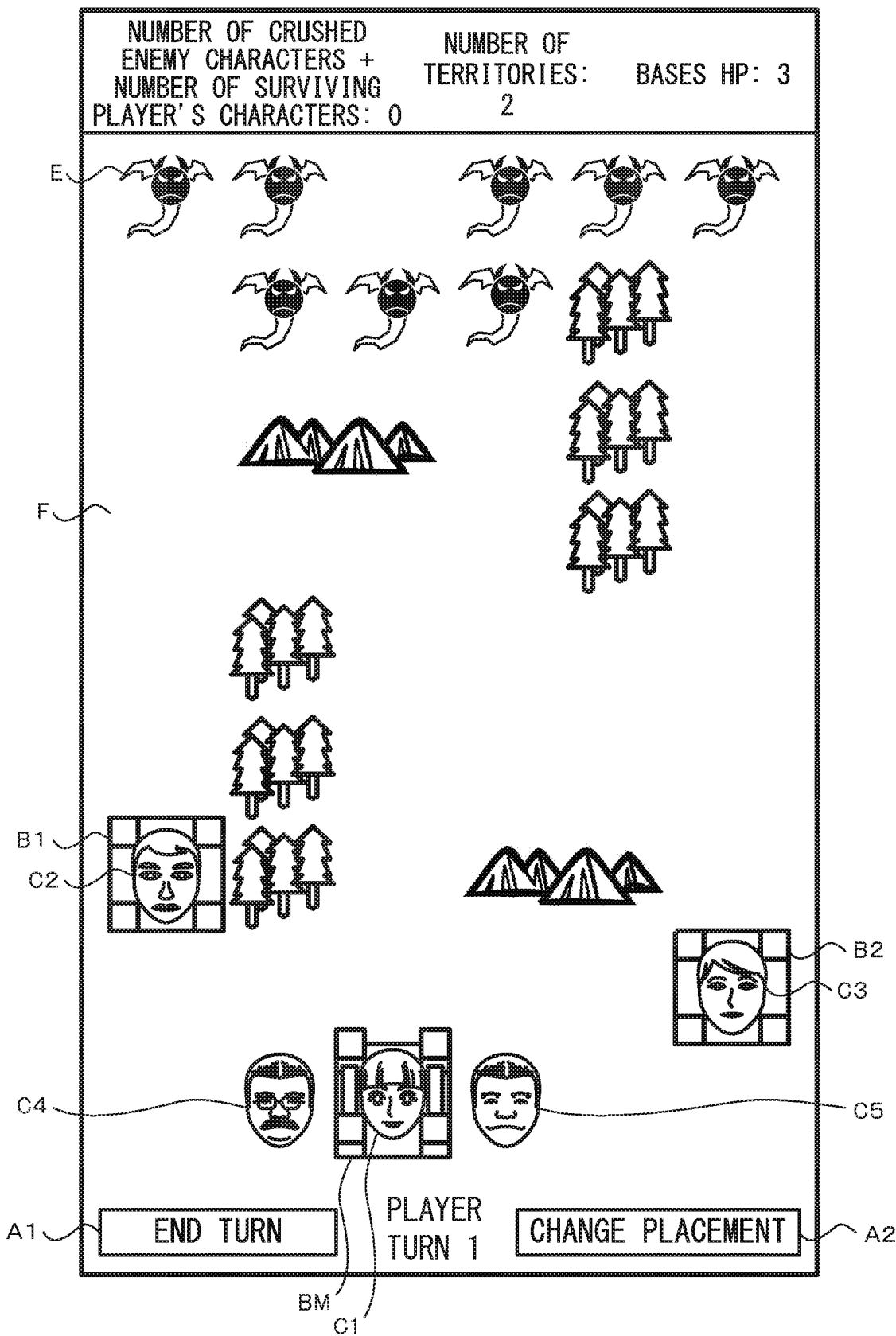
FIG. 4 is a diagram showing a non-limiting example of a game image displayed in the battle game performed in the information processing apparatus 3.

In FIG. 4, in initialization before the first player turn as the first turn in the battle game is started, player's characters (e.g., five player's characters) belonging to a single player's group (e.g., a first player's group) among the plurality of player's groups organized in the large troop set in the large troop organization deck area TA are initially placed at initial appearance positions set on the battle field F. For example, as shown in FIG. 4, the first player's group that appears in the initialization before the first player turn is formed of five player's characters C1 to C5. Further, the initial appearance positions are determined in advance on the battle field F. As an example, the initial appearance positions are set on a plurality of player's strongholds (the single base BM and the two territories B1 and B2 in the example of FIG. 4) and near the strongholds. Thus, in the example of FIG. 4, the player's character C1 is initially placed on the base BM and appears. The player's character C2 is initially placed on the territory B1 and appears. The player's character C3 is initially placed on the territory B2 and appears. The player's character C4 is initially placed near the base BM (e.g., a position near the left side of the base BM) and appears. The player's character C5 is initially placed near the base BM (e.g., a position near the right side of the base BM) and appears.

It should be noted that a configuration may be employed in which the positions of the player's characters initially placed at the initial appearance positions set on the battle field F can be switched between the player's characters. For example, when the user performs a predetermined operation (the operation of selecting an operation button A2 for giving an instruction to change placement (see FIGS. 4 and 7)) once, the placement positions of the respective player's characters may be changed such that at least two of the placement positions of the player's characters displayed initially placed at the initial appearance positions are switched. Further, a configuration may be employed in which such a placement change operation can be performed also when another player's character described later is initially placed.

Further, in the initialization before the first player turn as the first turn in the battle game is started, a plurality of enemy characters E are initially placed at initial appearance positions set on the battle field F. For example, in the example shown in FIG. 4, eight enemy characters E appear at positions on the battle field F distant from the plurality of player's strongholds.

In the battle game, by performing a predetermined operation using the input section 34, the user can select a player's character (an operation target character) to be operated during a player turn from a plurality of player's characters. Then, by performing a predetermined operation, the user can move the player's character as the operation target character on the battle field F or cause the player's character to attack an enemy character on the battle field F. Here, the distance at which a player's character can move on the battle field F in a single player turn is limited. The user can move a player's character within this limitation during a player turn. It should be noted that the distance at which a player's character can move in a single player turn may be set with respect to each attribute owned by the player's character. Further, the battle field F may be formed of grid-like squares where each character can be placed. In this case, the distance at which a player's character can move on the battle field F in a single player turn may be limited by the number of squares. A movement-possible distance may be set with respect to each attribute owned by a player's character so that the player's character can move one to three squares.

It should be noted that in the battle game, the distance at which a player's character can move on the battle field F in a single player turn is limited, and the player's character can move within the limited distance in accordance with a user operation. However, the player's character can also make a special movement between a plurality of strongholds. For example, when the player's character is on any of a plurality of strongholds (the single base BM and the two territories B1 and B2 in the example of FIG. 4), the player's character can move onto another stronghold without a moving distance (instantly move between strongholds, i.e., make a so-called warp movement). That is, using such a special movement between strongholds, the player's character can move between strongholds without adding a moving distance. Thus, the player's character can move a longer distance than the limited distance and instantly move onto a desired stronghold or close to the stronghold.

Figure 5:
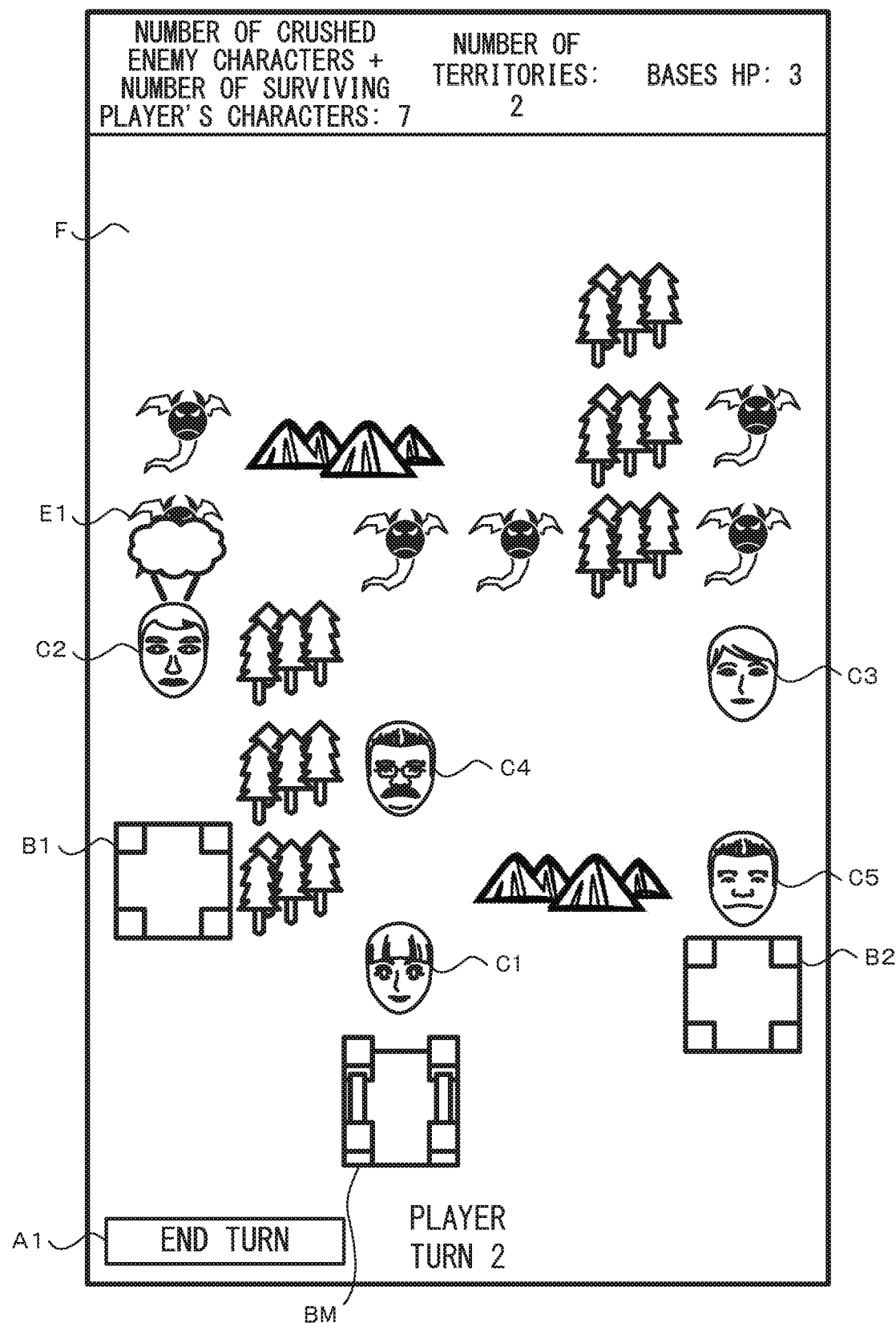
FIG. 5 is a diagram showing a non-limiting example of the game image displayed in the battle game performed in the information processing apparatus 3.

Further, during a player turn, in accordance with the positional relationship with an enemy character, a player's character can attack the enemy character. For example, when the positional relationship between a player's character as an operation target character and an enemy character corresponds to the distance at which an attack can be made (e.g., the distance at which the player's character and the enemy character have a positional relationship where the player's character and the enemy character are adjacent to each other), the user performs a predetermined operation, whereby the player's character can attack the enemy character. For example, FIG. 5 shows an example of the state where the player's character C2 placed at a position adjacent to an enemy character E1 attacks the enemy character E1. Then, when the attack effect of the player's character exceeds a survival parameter (e.g., hit points) owned by the enemy characters (when the hit points of the enemy characters become 0), the enemy character is defeated and erased from the battle field F. Further, "the number of crushed enemy characters+the number of surviving player's characters", which is one of battle scores displayed on the display section 35, is a numerical value obtained by adding the number of defeated enemy characters (the number of crushed enemy characters) and the number of player's characters remaining without being defeated in a battle (the number of surviving player's characters; described later). When an enemy character is defeated and erased from the battle field F, "the number of crushed enemy characters+the number of surviving player's characters" is displayed by adding "1" to "the number of crushed enemy characters+the number of surviving player's characters". It should be noted that an attack-possible distance at which a player's character can attack an enemy character may be set with respect to each attribute owned by the player's character. A configuration may be employed in which even when a player's character and an enemy character are away from each other on the battle field F, the player's character can attack the enemy character so long as the player's character is within the attack-possible distance. For example, when the battle field F is formed of grid-like squares where each character can be placed, an attack-possible distance may be set so that a player's character can attack an enemy character one to two squares away from the player's character with respect to each attribute owned by the player's character. It should be noted that in the exemplary embodiment, hit points of enemy characters are used as an example of a first parameter of a battle unit. The hit points of the enemy characters becoming 0 is used as an example of a first parameter condition.

Figure 6:
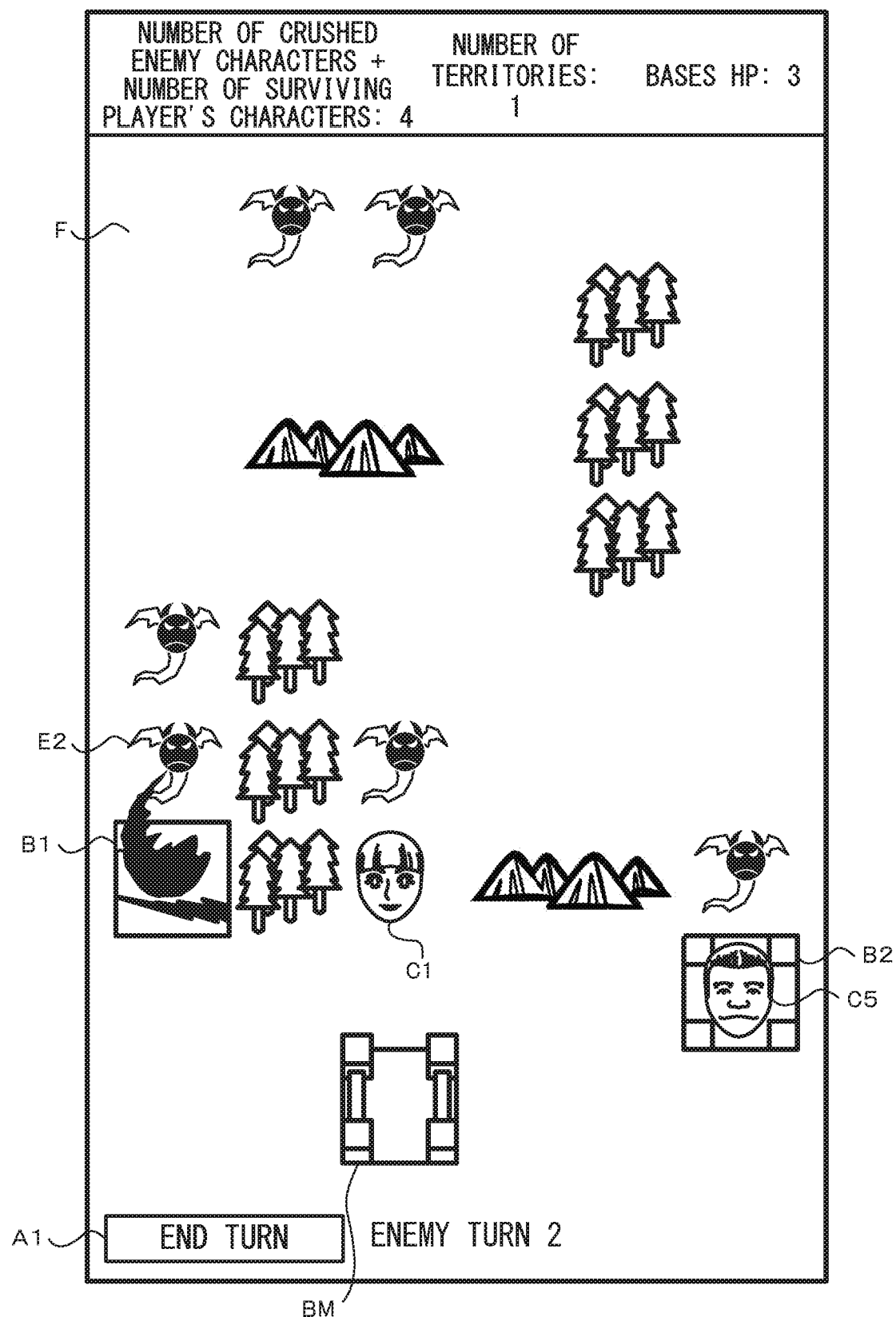
FIG. 6 is a diagram showing a non-limiting example of the game image displayed in the battle game performed in the information processing apparatus 3.

Then, when the actions (movement, attack, defense, waiting, or the like) of all the player's characters placed on the battle field F end, or when the user performs a predetermined operation (the operation of selecting an operation button A1 (see FIGS. 4 to 7) for giving an instruction to end the turn; the actions of all the player's characters are treated as ending by this operation), the player turn ends, and an opponent turn (an enemy turn) starts. For example, as shown in FIG. 6, in the enemy turn, by control of the control section 31, an enemy character moves on the battle field F, or an enemy character attacks a player's character or a stronghold (the base BM or the territory B) on the battle field F. For example, when the positional relationship between an enemy character and a player's character corresponds to the distance at which an attack can be made, the enemy character may attack the player's character by control of the control section 31. Then, when the attack effect of the enemy character exceeds a survival parameter (e.g., hit points) owned by the player's characters (when the hit points of the player's characters become 0), the player's character is defeated and erased from the battle field F. Further, when the positional relationship between an enemy character and a player's stronghold corresponds to the distance at which an attack can be made, the enemy character may attack the stronghold by control of the control section 31. Then, when the attack effect of the enemy character exceeds an endurance parameter (e.g., hit points) owned by the stronghold, the stronghold is destroyed, and the existence of the stronghold on the battle field F is disabled (e.g., the above special movement effect also vanishes). It should be noted that it is possible to place a player's character on a stronghold (the base BM or the territory B). When a player's character is placed on a stronghold, an enemy character cannot attack the stronghold. Thus, to attack a stronghold, an enemy character needs to defeat a player's character placed on the stronghold first. It should be noted that in the exemplary embodiment, hit points of player's characters are used as another example of the first parameter of the battle unit. The hit points of the player's characters becoming 0 is used as another example of the first parameter condition.

For example, FIG. 6 shows an example of the state where the territory B1 placed at a position adjacent to an enemy character E2 is destroyed by the attack of the enemy character E2. Then, "the number of territories", which is one of the battle scores displayed on the display section 35, also decreases from "2" to "1" by disabling the existence of the territory B1. It should be noted that "bases HP", which are hit points owned by the base BM, are also displayed as one of the battle scores on the display section 35. Also when points are subtracted from hit points of the base BM by an enemy character attacking the base BM, the value of the "bases HP" is also changed and displayed in accordance with the subtraction.

Then, when the actions of all the enemy characters placed on the battle field F end, the enemy turn ends, and a player turn starts anew. It should be noted that when the enemy turn ends, enemy characters may be added (reinforced) in accordance with the number of enemy characters remaining on the battle field F and appear on the battle field F. For example, when the number of enemy characters remaining on the battle field F is less than or equal to the number of initially placed enemy characters (eight in the example of FIG. 4), half as many (four in the example of FIG. 4) enemy characters as the number of initially placed enemy characters may be added and appear on the battle field F.

Further, if a predetermined update condition is satisfied during the battle game, the player's group appearing on the battle field F is replaced. For example, the update condition is set based on the number of elapsed turns. As an example, the update condition is set to be satisfied every time two player turns and two enemy turns end (i.e., every two turns if a set of a player turn and an enemy turn is a single turn). Under such an update condition, if the first player's group appears in the initialization before the first player turn starts, then when the second enemy turn ends, a second player's group, which is new, appears on the battle field F by replacing the first player's group. When the fourth enemy turn ends, a third player's group, which is new, appears on the battle field F by replacing the second player's group. When the sixth enemy turn ends, a fourth player's group, which is new, appears on the battle field F by replacing the third player's group. When the eighth enemy turn ends, a fifth player's group, which is new, appears on the battle field F by replacing the fourth player's group. Then, when the large troop is formed of five player's groups (first to fifth player's groups), the tenth enemy turn ends, whereby the battle game where all the player's groups are caused to appear ends.

Figure 7:
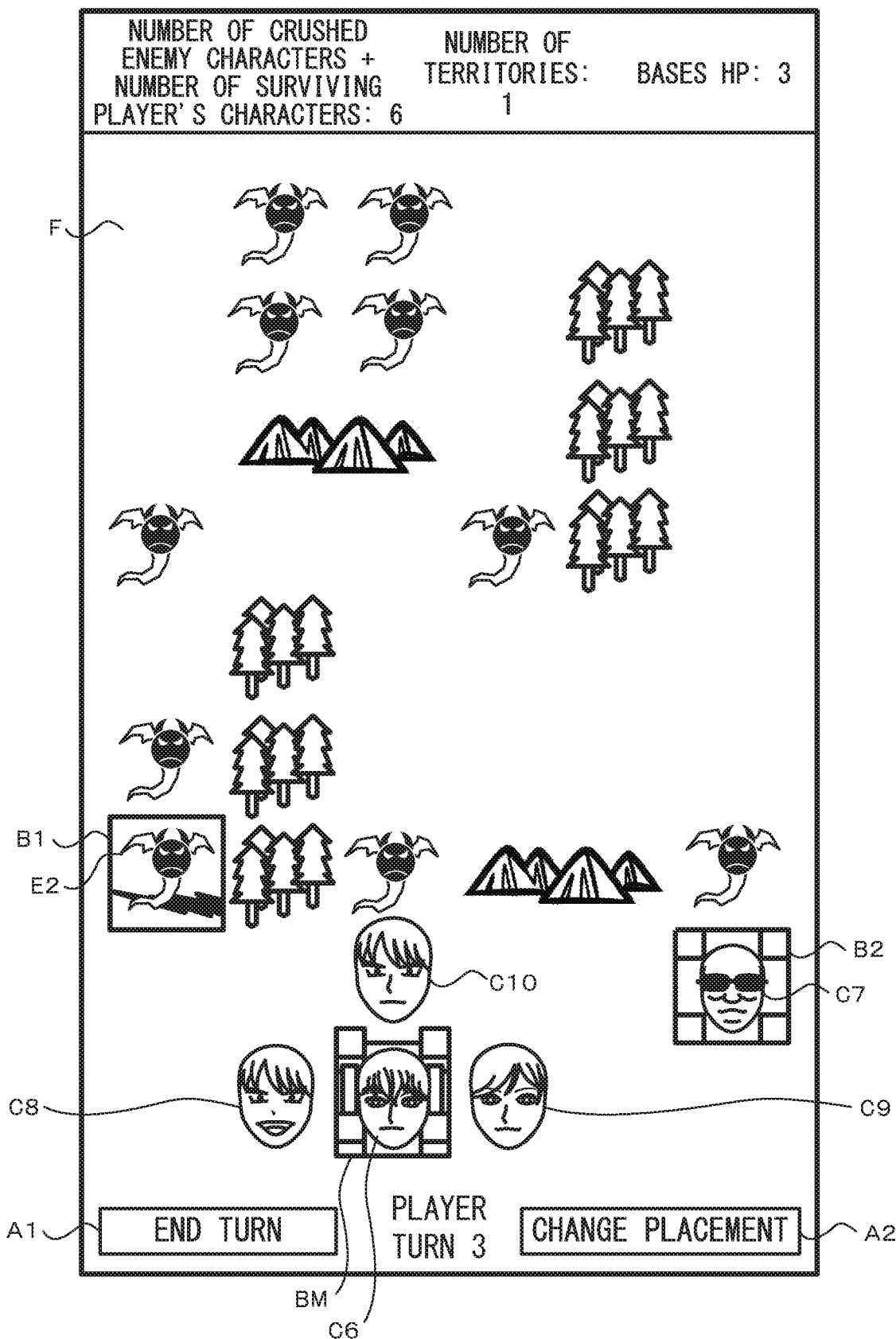
FIG. 7 is a diagram showing a non-limiting example of the game image displayed in the battle game performed in the information processing apparatus 3.

For example, as shown in FIG. 7, when the player's group is replaced as described above, then while the battle field F itself maintains the positions and the states of enemy characters on the battle field F and the positions and the states of player's strongholds, player's characters existing on the battle field F (e.g., player's characters belonging to the first player's group) are erased from the battle field F, and player's characters belonging to a new player's group (e.g., five player's characters belong to the second player's group) are placed on the battle field F. Then, when the player's group is replaced as described above, the number of player's characters existing on the battle field F is added to "the number of crushed enemy characters +the number of surviving player's characters", which is one of the battle scores displayed on the display section 35. Further, the placement positions of the player's characters to be newly placed by the replacement of the player's group are the same positions as the above initial appearance positions set on the battle field F, i.e., on a plurality of player's strongholds and near the strongholds. As an example, the placement positions are a position on the base BM, positions on the two territories B1 and B2, and positions near the left and right of the base BM. However, when any of the plurality of player's strongholds is destroyed and disabled, or when enemy characters are placed at the initial appearance positions, the placement positions of the player's characters to be newly placed may be set at positions different from the initial appearance positions (typically, positions around the initial appearance positions). For example, in the example of FIG. 7, the territory B1 is destroyed and disabled, and the enemy character E2 is placed on the territory B1. Thus, a player's character does not appear on the territory B1. Thus, in the example of FIG. 7, the second player's group to be newly placed is formed of five player's characters C6 to C10. The player's character C6 appears on the base BM. The player's character C7 appears on the territory B2. The player's character C8 appears near the base BM (e.g., a position near the left side of the base BM). The player's character C9 appears near the base BM (e.g., a position near the right side of the base BM). The player's character C10 appears near the base BM (e.g., a position near the upper side of the base BM).

It should be noted that in the above description, when the player's group is replaced, all the player's characters existing on the battle field F (e.g., player's characters belonging to the first player's group) may be erased from the battle field F, or some of the player's characters existing on the battle field F may be erased from the battle field F. In the first case, a large number of characters owned by the user can be used in the battle game. In the second case, it is possible that after at least one player's character existing on the battle field F is erased, a player's character is added and appears such that player's characters existing on the battle field F reaches the number of initially placed player's characters (e.g., five). Thus, it is possible to achieve a battle game where a new player's character is reinforced on the same battle field F by taking advantage of the effects of surviving player's characters. It should be noted that in the second case, the number of player's character to newly appear cannot be finalized until the player's group is replaced. Thus, a player's group to newly appear in this replacement may be determined at the time of the replacement.

Then, in a player turn (e.g., the third player turn) in which a player's character belonging to the new player's group appears, the user performs a predetermined operation using the input section 34 and thereby can move the player's character that newly appears, as an operation target character on the battle field F, or cause the player's character to attack an enemy character on the battle field F.

It should be noted that when the player's group is replaced as described above, a player's character existing on the battle field F is erased from the battle field F. In this case, the player's character may be erased from a display screen (the display section 35), or the player's character may evacuate to outside the battle field F, i.e., may still be displayed on the display screen (the display section 35).

The battle game progresses by alternately repeating such player turns and enemy turns and ends when a battle using all the plurality of player's groups organized in the large troop set in the large troop organization deck area TA is performed Then, a total score up to this time is calculated. For example, the total score of the battle game is calculated based on "the evaluation of the number of crushed enemy characters+the number of surviving player's characters", a "territory defense evaluation", and a "base defense evaluation" (e.g., by adding all values based on the evaluations). As an example, "the evaluation of the number of crushed enemy characters+the number of surviving player's characters" is an evaluation based on a number obtained by adding the number of defeated enemy characters (the number of crushed enemy characters) and the number of player's characters replaced or remaining to the end of the game without being defeated in the battle (the number of surviving player's characters), and is calculated by (the number of crushed enemy characters+the number of surviving player's characters)×a crush coefficient (defined with respect to each battle field). Here, the number of player's characters replaced or remaining to the end of the game (the number of surviving player's characters) is calculated every time the player's group is replaced and when the game ends. Thus, in "the evaluation of the number of crushed enemy characters+ the number of surviving player's characters", an evaluation (a score) based on the number of surviving player's characters is accumulated every time the player's group is replaced and when the game ends. Further, the "territory defense evaluation" is an evaluation based on the number of territories B remaining enabled when the game ends, and is calculated by the total stronghold occupation points (defined with respect to each battle field)×the number of remaining territories/the number of initial territories. Then, the "base defense evaluation" is an evaluation based on the value of an endurance parameter (hit points) of the base BM remaining when the game ends, and is calculated by the total own army base points (defined with respect to each battle field)×a remaining parameter of the base BM/an initial parameter of the base BM. It should be noted that in the exemplary embodiment, "the evaluation of the number of crushed enemy characters+the number of surviving player's characters" is used as an example of a number-of-surviving-enemy-characters parameter and a number-of-crushed-enemy-characters parameter. A "territory defense evaluation" and a "base defense evaluation" are used as examples of a number-of-defense-units parameter.

As described above, in the battle game, in a game where player's characters compete against enemy characters using the same battle field F, all the player's characters organized in the large troop set in the large troop organization deck area TA are caused to appear on the same battle field F and used. Thus, it is possible to improve interest due to the fact that player's characters cooperate to compete. Further, an update condition for replacing player's characters (a player's group) is determined in advance, whereby it is possible to create an unconventional level of strategy in a battle game using player's characters.

It should be noted that in the above description, a player's group that appears on the battle field F is replaced with a new player's group when an enemy turn ends. This creates the advantage of making a player's character more likely to survive by defeating as many enemy characters as possible than in a case where a player's group is replaced with a new player's group when a player turn ends. Thus, it is possible to increase the importance of competing against enemy characters. If, however, such effects are not desired, a player's group that appears on the battle field F may be replaced with a new player's group when a player turn ends. Further, in the above description, the timing when an enemy character is added and reinforced is also when an enemy turn ends. Consequently, if the number of enemy characters is decreased in a player turn, the number of enemy characters in an enemy turn after that will decrease. Thus, it is possible to soften an attack on player's characters during the enemy turn. This creates the advantage of making a player's character more likely to survive by defeating as many enemy characters as possible than in a case where a new enemy character is added when a player turn ends. Thus, it is possible to increase the importance of competing against enemy characters. If, however, such effects are not desired, a new enemy character may be added when a player turn ends.

Further, in the above exemplary embodiment, an example has been used where the update condition for replacing the player's group is set based on the number of elapsed turns, and as an example, is set to be satisfied every time two player turns and two enemy turns end (i.e., every two turns if a set of a player turn and an enemy turn is a single turn). Alternatively, the player's group may be replaced under another update condition. For example, the update condition may be set to be satisfied every time an enemy turn ends (i.e., every single turn if a set of a player turn and an enemy turn is a single turn). Alternatively, the update condition may be set to be satisfied every time three or more player turns and three or more enemy turns end (i.e., every three or more turns if a set of a player turn and an enemy turn is a single turn).

Further, as another example of the turn system game, a battle game is possible where an enemy turn in which enemy characters attack player's characters is not present, and only a player turn in which player's characters perform actions elapses. In this case, when all the player's characters placed on the battle field F perform actions, a single turn may elapse, and an update condition may be set based on the number of elapsed turns.

Further, the update condition for replacing the player's group may be set based on a factor different from the number of elapsed turns. As a first example, the update condition for replacing the player's group may be set based on the lapse of time (in-game time) in a battle game. For example, in the case of a battle game that progresses in accordance with the lapse of time, the update condition may be set to be satisfied every time predetermined in-game time elapses in the battle game (e.g., every minute). As a second example, the update condition for replacing the player's group may be set based on a task set in a battle game. For example, the update condition may be set to be satisfied every time a predetermined task (which is for achieving a result in a predetermined game, such as defeating a predetermined number of enemy characters, defeating a particular enemy character, acquiring an item placed on the battle field F, capturing a stronghold for the enemy, succeeding in defending a player's stronghold, or reaching a predetermined spot) is cleared in a battle game.

Further, in the above exemplary embodiment, player's groups are organized so that the same player's character does not doubly belong to different player's groups. Consequently, it is possible to use as many types of player's characters as possible in a battle game. If, however, such effects are not desired, the same player's character may doubly belong to different player's groups. Further, a player's group may be formed of a different number of player's characters or a single player's character, and may only need to include at least one player's character.

Further, in the above exemplary embodiment, the description has been given using a game where player's characters compete against enemy characters while defending player's strongholds. Alternatively, a game may be employed where different game units compete and/or appear. Here, a "unit" includes various virtual objects used for a battle or a battle, including a character, a card, a weapon, a facility, a spot, a building, and the like. Thus, a player's unit that competes may be a game card, a weapon, a facility, a spot, a building, or the like as well as a player's character. An enemy unit that competes may also be a game card, a weapon, a facility, a spot, a building, or the like as well as an enemy character. Further, the strongholds (the base BM and the territory B) function as a defense unit that player's characters defend from enemy characters. Alternatively, a battle game may be employed where player's characters defend another defense unit. For example, a defense unit that player's characters defend from enemy characters may be a game character, a game card, a weapon, a facility, a spot, a building, or the like.

Next, the details of the processing performed by the information processing apparatus 3 are described. First, with reference to FIG. 8, a description is given of main data used in the processing performed by the information processing apparatus 3. It should be noted that FIG. 8 is a diagram showing examples of main data and programs stored in the storage section 32 of the information processing apparatus 3.

Figure 8:
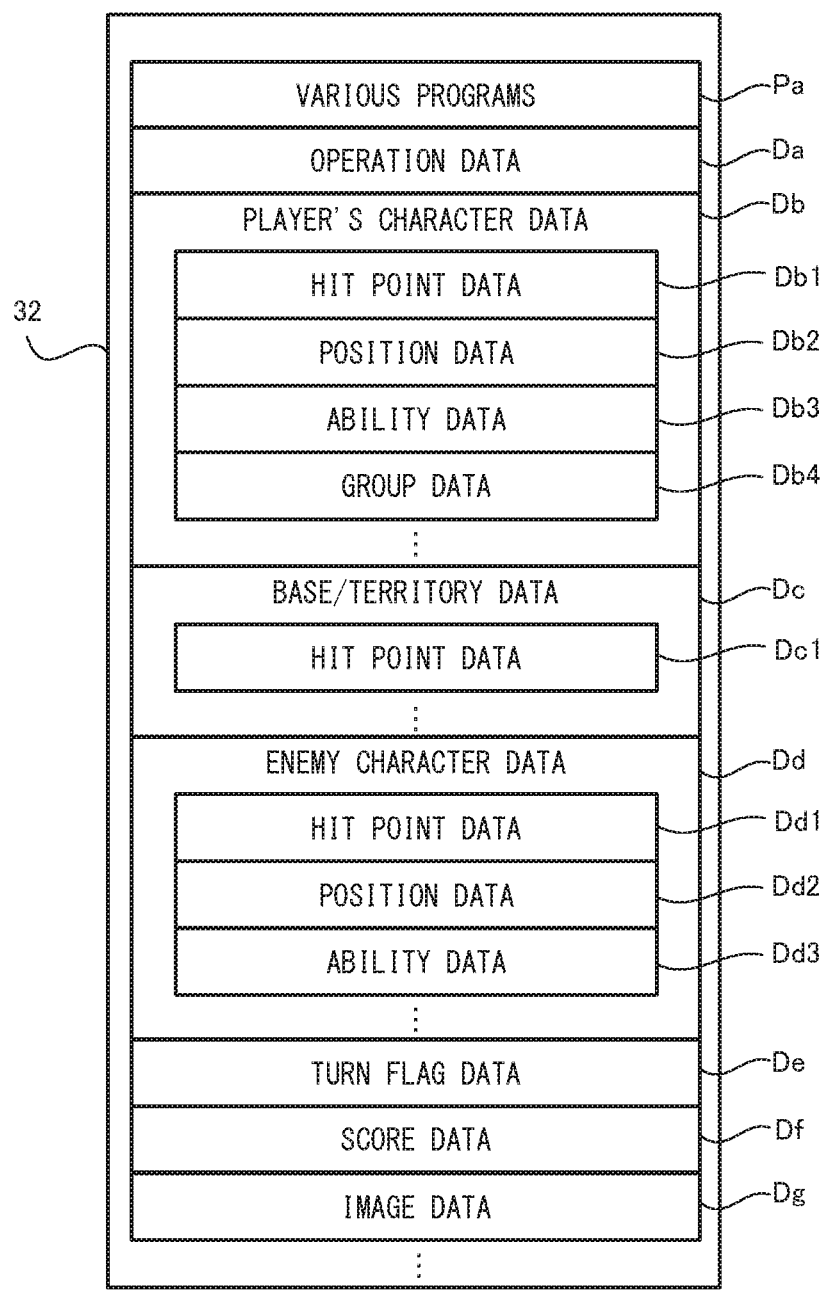
FIG. 8 is a diagram showing non-limiting examples of main data and programs stored in a storage section 32 of the information processing apparatus 3.

As shown in FIG. 8, the following are stored in the data storage area of the storage section 32: operation data Da; player's character data Db; base/territory data Dc; enemy character data Dd; turn flag data De; score data Df; image data Dg; and the like. It should be noted that the storage section 32 stores, as well as the data included in the information shown in FIG. 8, data and the like necessary for the processing, such as data used in an application to be executed. Further, in the program storage area of the storage section 32, various programs Pa included in a communication program and an information processing program (a game program) are stored.

The operation data Da is data indicating operation information of the operation performed on the information processing apparatus 3 by the user. For example, operation data indicating the operation performed on the input section 34 is acquired per time unit that the information processing apparatus 3 performs processing (e.g., every ⅟₆₀ second), and the operation data is stored and updated in the operation data Da in accordance with the acquisition.

The player's character data Db is data indicating the profile and the ability value of each character (player's character) that the user causes to make a sortie, and data indicating the state of the player's character on the battle field F. The player's character data Db includes hit point data Db1, position data Db2, ability data Db3, group data Db4, and the like. The hit point data Db1 is data indicating a survival parameter (hit points) owned by the player's character. The position data Db2 is data indicating the position where the player's character is placed on the battle field F. The ability data Db3 is data indicating an ability value owned by the player's character and is data indicating ability values such as a movement-possible distance, an attack-possible distance, an offensive strength, a defensive strength, a velocity, and a magic defensive strength. The group data Db4 is data indicating a player's group to which the player's character belongs.

The base/territory data Dc is data indicating the states of a base BM and a territory B placed on the battle field F and includes hit point data Dc1 indicating an endurance parameter (e.g., hit points) owned by each of the base BM and the territory B, and the like.

The enemy character data Dd is data indicating the profile and the ability value of each character (enemy character) that competes, and data indicating the state of the enemy character on the battle field F. The enemy character data Dd includes hit point data Dd1, position data Dd2, ability data Dd3, and the like. The hit point data Dd1 is data indicating a survival parameter (hit points) owned by the enemy character. The position data Dd2 is data indicating the position where the enemy character is placed on the battle field F. The ability data Dd3 is data indicating the ability values owned by the enemy character and is data indicating ability values such as a movement-possible distance, an attack-possible distance, an offensive strength, a defensive strength, a velocity, a magic defensive strength, and the like.

The turn flag data De is data indicating a turn flag that is set to on in a player turn.

The score data Df is data indicating a numerical value (a total score) for the user to clear a battle game and receive a reward. For example, the score data Df includes data indicating the evaluation of the number of crushed enemy characters+the number of surviving player's characters, data indicating the territory defense evaluation, data indicating the base defense evaluation, and data indicating the total score.

The image data Dg is data for displaying an image on the display screen during a battle game.

Figure 9:
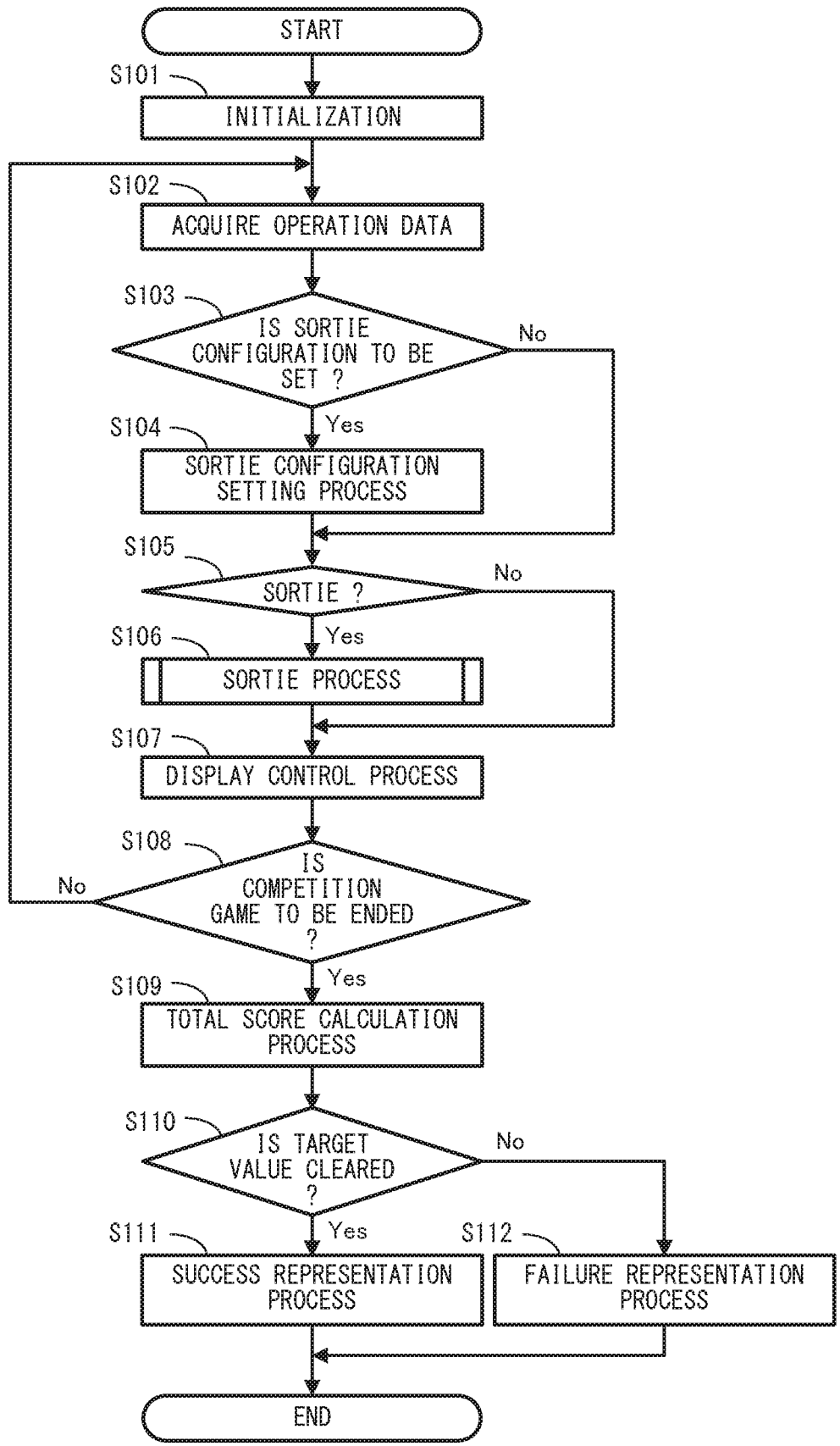
FIG. 9 is a flow chart showing a non-limiting example of the processing executed by the information processing apparatus 3.
Figure 10:
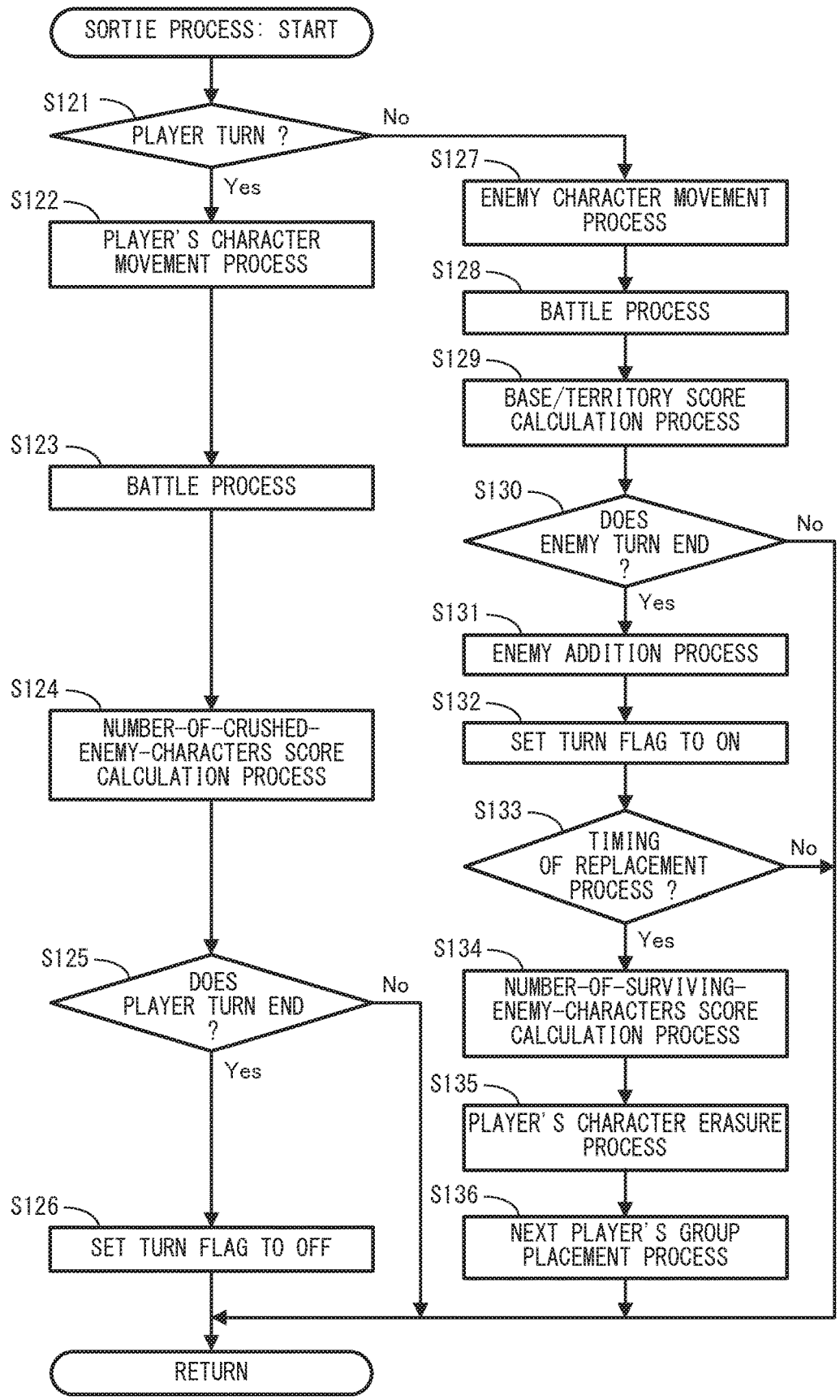
FIG. 10 is a subroutine showing a non-limiting example of detailed processing of a sortie process in step S106 in FIG. 9.

Next, with reference to FIGS. 9 and 10, a description is given of the details of the processing performed by each information processing apparatus 3. It should be noted that FIG. 9 is a flow chart showing an example of the processing executed by the information processing apparatus 3. FIG. 10 is a subroutine showing an example of detailed processing of a sortie process in step S106 in FIG. 9. Here, in the flow charts shown in FIGS. 9 and 10, a description is given mainly of, in the processing performed by the information processing system 1, a battle game process performed by the information processing apparatus 3. The detailed descriptions of other processes not directly related to these processes are omitted. Further, in FIGS. 9 and 10, all of the steps performed by the control section 31 are abbreviated as "S".

In the exemplary embodiment, a series of processes shown in FIGS. 9 and 10 is performed by the control section 31 (the CPU) executing the game program stored in the program storage section 33. It should be noted that the processing shown in FIGS. 9 and 10 may be started at any timing. At this time, a part or all of the game program is loaded into the storage section 32 at an appropriately timing and executed by the control section 31. Consequently, the series of processes shown in FIGS. 9 and 10 is started. It should be noted that the game program is stored in advance in the program storage section 33. Alternatively, in another exemplary embodiment, the game program may be acquired from a storage medium attachable to and detachable from the information processing apparatus 3 and stored in the storage section 32, or may be acquired from another apparatus via a network such as the Internet and stored in the storage section 32.

It should be noted that the processes of all the steps in the flow charts shown in FIGS. 9 and 10 are merely illustrative. Thus, the processing order of the steps may be changed, or another process may be performed in addition to, and/or instead of, the processes of all the steps, so long as similar results are obtained. Further, in the exemplary embodiment, descriptions are given on the assumption that the control section 31 performs the processes of all the steps in the flow charts. Alternatively, a processor or a dedicated circuit other than the CPU of the control section 31 may perform the processes of some or all of the steps in the flow charts.

In FIG. 9, the control section 31 performs initialization (step S101), and the processing proceeds to the next step. For example, the control section 31 initializes parameters for use in the following processing. For example, the control section 31 sets the battle field F where a battle game is performed, and also initializes strongholds (a base BM and a territory B) to be placed on the battle field F, thereby initializing the base/territory data Dc. The control section 31 initializes the enemy character data Dd of each enemy character to be initially placed on the battle field F. Further, the control section 31 sets the turn flag to on, thereby initializing the turn flag data De.

Next, the control section 31 acquires operation data from the input section 34 and updates the operation data Da (step S102), and the processing proceeds to the next step.

Next, the control section 31 determines whether or not a sortie configuration (a large troop organization) is to be set (step S103). Then, when a sortie configuration is to be set, the processing proceeds to step S104. On the other hand, when a sortie configuration is not to be set, or when a sortie is already being made in the battle game, the processing proceeds to step S105. For example, with reference to the operation data Da, when a user operation for forming a large troop by selecting characters from owned characters is performed, the determination is affirmative in the above step S103.

In step S104, the control section 31 performs the process of setting a sortie configuration, and the processing proceeds to step S105. For example, the control section 31 forms a large troop organization setting screen on which the large troop organization deck area TA and the owned character area CA are displayed as shown in FIG. 2. Then, the control section 31 generates an image in which images representing characters owned at the current moment are arranged in the owned character area CA. Then, the control section 31 displays the game image in a display control process in step S107 described later. Further, with reference to the operation data Da, the control section 31 selects a character subjected to a user operation for including the character in the large troop organization deck area TA. Then, the control section 31 sets the player's character data Db using the character as a player's character and also generates an image in which an image representing the player's character is arranged in the large troop organization deck area TA. Then, the control section 31 displays the game image in the display control process step S107 described later. Further, the control section 31 divides a player's character group placed in the large troop organization deck area TA into a plurality of player's groups and organizes player's characters in each player's group, thereby setting the group data Db4 of each player's character. Then, the control section 31 sets initial appearance positions determined in advance as positions on the battle field F of player's characters belonging to a player's group (e.g., a first player's group) that first makes a sortie, thereby updating the position data Db2 of the player's characters.

In step S105, the control section 31 determines whether or not a sortie is to be made to battle against enemy characters. Then, when a sortie is to be made, or when a sortie is already made, the processing proceeds to step S106. On the other hand, when a sortie is not to be made, the processing proceeds to step S107. For example, with reference to the operation data Da, when a user operation for making a sortie is performed, or when a battle against enemy characters is currently performed, the determination is affirmative in the above step S105.

In step S106, the control section 31 performs a sortie process, and the processing proceeds to step S107. With reference to FIG. 10, a description is given below of the sortie process performed in the above step S106.

In FIG. 10, the control section 31 determines whether or not the current moment is a player turn (step S121). For example, when the turn flag indicated by the turn flag data De is set to on, the determination is affirmative in the above step S121. Then, when the current moment is a player turn, the processing proceeds to step S122. On the other hand, when the current moment is an enemy turn, the processing proceeds to step S127.

In step S122, the control section 31 performs a player's character movement process, and the processing proceeds to the next step. For example, in accordance with a user operation, the control section 31 moves a player's character placed on the battle field F. Specifically, with reference to the operation data Da, when the operation of moving any of the player's characters as an operation target character on the battle field F is performed, then in accordance with the operation, the control section 31 moves the position of the player's character and updates the position data Db2 of the player's character using the position after the movement. It should be noted that the amount of movement, the moving velocity, and the movement-possible location of the player's character are controlled based on movement characteristics in the ability data Db3 of the player's character.

Next, the control section 31 performs a battle process between a player's character and an enemy character (step S123), and the processing proceeds to the next step. For example, when the user performs the operation of attacking an enemy character, the control section 31 performs the process in which the player's character and the enemy character battle against each other, corresponding to the operation, thereby updating the hit point data Db1 of the player's character and the hit point data Dd1 of the enemy character. In the above battle process, an image in which both characters battle against each other is generated, the amount of damage and the winning or losing are determined based on the abilities and the like of both characters, and points are subtracted from hit points corresponding to the damage, thereby updating the hit point data Db1 and Dd1. Then, a character of which the hit points become 0 is erased (evacuated) from the battle field F. It should be noted that in the battle process in the above step S123, the ability and the attack-possible distance of the player's character when battling against the enemy character are set based on the ability data Db3 of the player's character.

Next, the control section 31 performs a number-of-crushed-enemy-characters score calculation process (step S124), and the processing proceeds to the next step. For example, when a single enemy character is defeated and crushed in the above step S123, the control section 31 adds 1 to the number of crushed enemy characters, evaluates the number of crushed enemy characters+the number of surviving player's characters, and updates data indicating the evaluation of the number of crushed enemy characters+the number of surviving player's characters in the score data Df in accordance with the evaluation result. Further, the control section 31 adds 1 to "the number of crushed enemy characters+the number of surviving player's characters", which is one of the battle scores displayed on the display section 35, and displays "the number of crushed enemy characters+the number of surviving player's characters" after the addition in the display control process in step S107 described later.

Next, the control section 31 determines whether or not the player turn ends (step S125). For example, when the actions of all the player's characters placed on the battle field F end, or when the operation data Da indicates that the user performs a predetermined operation (the operation of selecting the operation button A1 for giving an instruction to end the turn), the determination is affirmative in the above step S125. Then, when the player turn ends, the processing proceeds to step S126. On the other hand, when the player turn does not end, the processing of this subroutine ends.

In step S126, the control section 31 sets the turn flag to off, thereby updating the turn flag data De. Then, the processing of this subroutine ends.

On the other hand, when it is determined in the above step S121 that the current moment is an enemy turn, the control section 31 performs an enemy character movement process (step S127), and the processing proceeds to the next step. For example, based on a predetermined algorithm, the control section 31 moves an enemy character placed on the battle field F. Specifically, the control section 31 moves any of the enemy characters as a movement target character on the battle field F and updates the position data Dd2 of the enemy character using the position after the movement. It should be noted that the amount of movement, the moving velocity, and the movement-possible location of the enemy character are controlled based on movement characteristics in the ability data Dd3 of the enemy character.

Next, the control section 31 performs a battle process between an enemy character and a player's character (step S128), and the processing proceeds to the next step. For example, when an enemy character attacks a player's character, the control section 31 performs the process in which the enemy character and the player's character battle against each other, thereby updating the hit point data Dd1 of the enemy character and the hit point data Db1 of the player's character. In the above battle process, an image in which both characters battle against each other is generated, the amount of damage and the winning or losing are determined based on the abilities of both characters, and points are subtracted from hit points corresponding to the damage, thereby updating the hit point data Dd1 and Db1. Then, a character of which the hit points become 0 is erased (evacuated) from the battle field F. Further, when an enemy character attacks a stronghold (the base BM or the territory B), the control section 31 performs the process in which the enemy character attacks the stronghold, thereby updating the hit point data Dc1 of the stronghold. Also in the process in which the enemy character attacks the stronghold, an image in which the enemy character attacks the stronghold is generated, and the amount of damage of the stronghold is determined based on the ability of the enemy character, the durability of the stronghold, and the like, points are subtracted from hit points corresponding to the damage, thereby updating the hit point data Dc1 of the stronghold. Then, a stronghold of which the hit points become 0 is destroyed on the battle field F and disabled. It should be noted that in the battle process in the above step S128, the ability and the attack-possible distance of the enemy character when battling against the player's character or attacking on the stronghold are set based on the ability data Dd3 of the enemy character.

Next, the control section 31 performs a base/territory score calculation process (step S129), and the processing proceeds to the next step. For example, when a player's stronghold is destroyed in the above step S128, the control section 31 evaluates territory defense and evaluates base defense based on the amount of subtraction of the hit points of the stronghold corresponding to the destruction and the number of strongholds disabled on the battle field F. In accordance with the evaluation result, the control section 31 updates data indicating the territory defense evaluation and data indicating the base defense evaluation in the score data Df. Further, based on the amount of subtraction of the hit points of the stronghold corresponding to the destruction and the number of strongholds disabled on the battle field F, the control section 31 also updates "the number of territories" and/or the "bases HP", which are battle scores displayed on the display section 35. Then, the control section 31 displays "the number of territories" and/or the "bases HP" after the updates in the display control process in step S107 described later.

Next, the control section 31 determines whether or not the enemy turn ends (step S130). For example, when the actions of all the enemy characters placed on the battle field F end, the determination is affirmative in the above step S130. Then, when the enemy turn ends, the processing proceeds to step S131. On the other hand, when the enemy turn does not end, the processing of this subroutine ends.

In step S131, the control section 31 performs an enemy addition process, and the processing proceeds to the next step. For example, in accordance with the number of enemy characters remaining on the battle field F, the control section 31 performs the process of adding (reinforcing) an enemy character at a predetermined position on the battle field F and causing the enemy character to appear. Specifically, when the number of enemy characters remaining on the battle field F is less than or equal to the number of initially placed enemy characters (e.g., eight), then to add half as many (e.g., four) enemy characters as the number of initially placed enemy characters to predetermined positions on the battle field F, the control section 31 adds the enemy character data Dd corresponding to the enemy characters to be added.

Next, the control section 31 sets the turn flag to on, thereby updating the turn flag data De (step S132). Then, the processing proceeds to the next step.

Next, the control section 31 determines whether or not the current moment is the timing of the replacement process (step S133). For example, as described above, when the update condition based on the number of elapsed turns is set in advance, and the current moment satisfies the update condition (e.g., when the second, fourth, sixth, or eighth enemy turn ends), the determination is affirmative in the above step S133. Then, when the current moment is the timing of the replacement process, the processing proceeds to step S134. On the other hand, when the current moment is not the timing of the replacement process, the processing of this subroutine ends.

In step S134, the control section 31 performs a number-of-surviving-enemy-characters score calculation process, and the processing proceeds to the next step. For example, the control section 31 adds the number of player's characters remaining on the battle field F to the number of surviving player's characters and evaluates the number of crushed enemy characters+the number of surviving player's characters. Then, in accordance with the evaluation result, the control section 31 updates data indicating the evaluation of the number of crushed enemy characters+the number of surviving player's characters in the score data Df. Further, the control section 31 adds the number of player's characters remaining on the battle field F to "the number of crushed enemy characters+the number of surviving player's characters", which is one of the battle scores displayed on the display section 35. Then, the control section 31 displays "the number of crushed enemy characters+the number of surviving player's characters" after the addition in the display control process in step S107 described later.

Next, the control section 31 performs a player's character erasure process (step S135), and the processing proceeds to the next step. For example, the control section 31 updates the player's character data Db of each player's character so that the player's character remaining on the battle field F is erased from the battle field F (e.g., updates the position data Db2 to Null or deletes the player's character data Db of the erasure target).

Next, the control section 31 performs a next player's group placement process (step S136), and the processing of this subroutine ends. For example, the control section 31 updates the player's character data Db of a player's character such that the player's character belonging to a next player's group appears on the battle field F. As an example, the control section 31 sets an initial appearance position determined in advance, as the position on the battle field F of a player's character belonging to a player's group to make a sortie next (e.g., the second player's group when the battle of the first player's group ends), thereby updating the position data Db2 of the player's character. It should be noted that as described above, when the initial appearance position is in the state where the player's character cannot appear (e.g., the state where a stronghold is destroyed, or the state where an enemy character is placed), the position data Db2 of the player's character may be updated using an appearance candidate position as a substitute different from the initial appearance position.

Referring back to FIG. 9, after the sortie process in the above step S106, the control section 31 performs a display control process for generating a display image and displaying the display image on the display section 35 (step S107), and the processing proceeds to the next step. For example, when a sortie configuration is currently set, the control section 31 forms a large troop organization setting screen on which the large troop organization deck area TA and the owned character area CA are displayed, arranges images representing characters owned at the current moment in the owned character area CA, generates images representing player's characters arranged in the large troop organization deck area TA by a user operation, and displays the images on the display section 35. Further, for example, when player's characters are battling against enemy characters, the control section 31 performs the process of, based on parameters for generating a battle game image (e.g., data indicating the position of each character, and data indicating the position and the orientation of a virtual camera), constructing a virtual world on the battle field F and displaying an image representing the virtual world on the display section 35. Further, the control section 31 performs the process of generating a display image corresponding to the processing result in each of the above step (i.e., displaying a turn at the current moment based on the turn flag set in the turn flag data De, and displaying a score at the current moment based on the score data Df) and displaying the display image on the display section 35.

Next, the control section 31 determines whether or not to end the battle game (step 108). Examples of conditions for ending the battle game include: the satisfaction of the conditions under which the battle game is ended (for example, the hit points set for the base BM become 0); and the fact that the user performs the operation of ending the battle game. When the battle game is not to be ended, the control section 31 returns to the above step 102, and repeats the process thereof. When the battle game is to be ended, the processing proceeds to step S109.

In step S109, the control section 31 performs a total score calculation process, and the processing proceeds to the next step. For example, the control section 31 adds the number of player's characters remaining on the battle field F when the game ends to the number of surviving player's characters, and evaluates the number of crushed enemy characters+the number of surviving player's characters. Then, in accordance with the evaluation result, the control section 31 updates data indicating the evaluation of the number of crushed enemy characters+the number of surviving player's characters in the score data Df. Then, using data indicating the evaluation of the number of crushed enemy characters+ the number of surviving player's characters, data indicating the territory defense evaluation, and data indicating the base defense evaluation that are indicated by the score data Df, the control section 31 calculates the total score in the battle game that ends, thereby updating data indicating the total score in the score data Df.

Next, the control section 31 determines whether or not the total score calculated in the above step S109 clears a target value in the battle game that ends (step S110). Then, when the total score clears the target value, the processing proceeds to step S111. On the other hand, when the total score does not clear the target value, the processing proceeds to step S112.

In step S111, the control section 31 generates an image that performs success representation (winning representation) indicating that the total score earned in the battle game clears the target value. Then, the control section 31 displays the image on the display section 35 and ends the processing using this flow chart. As an example, when the total score earned in the battle game clears the target value, a reward (an item that can be used in the battle game, or the like) is given to the user. Thus, with information indicating the total score, an image indicating that the reward is given is displayed as the image that performs success representation.

On the other hand, in step S112, the control section 31 generates an image that performs failure representation (losing representation) indicating that the total score earned in the battle game does not clear the target value. Then, the control section 31 displays the image on the display section 35 and ends the processing using this flow chart.

As described above, according to the information processing apparatus 3 for performing the above game processing, in a game where player's characters compete against enemy characters using the same battle field F, a plurality of player's groups can be organized using all the player's characters set in the large troop organization deck area TA, and each player's group can be sequentially caused to appear on the same battle field F and used. Thus, it is possible to improve interest due to the fact that player's characters cooperate to compete.

It should be noted that the above descriptions have been given using an example where the information processing apparatus 3 performs information processing. Alternatively, another apparatus may perform at least some of the processing steps in the above processing. For example, a server capable of communicating with the information processing apparatus 3 and another apparatus (e.g., another game apparatus or another mobile terminal) may cooperate to perform the processing steps in the above processing. A server or another apparatus may thus perform at least some of the processing steps in the above processing, thereby enabling processing similar to that described above. Further, the above processing can be performed by a processor or the cooperation of a plurality of processors, the processor or the plurality of processors included in an information processing system including at least one information processing apparatus. Further, in the above exemplary embodiment, the processing of the above flow charts is performed by the control section 31 of the information processing apparatus 3 executing a predetermined program. Alternatively, part or all of the processing of the flow charts may be performed by a dedicated circuit included in the information processing apparatus 3.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the steps in the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above programs may be supplied to the information processing apparatus 3 not only through an external storage medium such as an external memory, but also through a wired or wireless communication link. Further, the programs may be stored in advance in a non-volatile storage device included in the information processing apparatus 3. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing program, an information processing apparatus, an information processing system, an information processing method, and the like in order, for example, to improve interest in a game where a player's unit and an enemy unit compete against each other in accordance with a positional relationship in a battle field.

What is claimed is:

1. A non-transitory computer-readable storage medium having stored therein an information processing program to be executed by a computer of an information processing apparatus including an input device and a display providing a graphical user interface coupled to the computer, the information processing apparatus configured to define a virtual space including a battle field of a battle game in response to inputs from the input device and to display the battle field on the display, the information processing program causing the computer to execute operations comprising:
setting a plurality of player's groups each including at least one player's unit;
placing a player's unit included in a first player's group and an enemy unit on the battle field in the virtual space, the first player's group being among the plurality of player's groups;
executing the battle game where at least one of battle units including the player's unit and the enemy unit are moved on the battle field, and the player's unit and the enemy unit are caused to battle against each other in accordance with a positional relationship on the battle field; and
using a computer-implemented counter to count a number of elapsed turns or in-game time in the battle game, wherein
if the number of elapsed turns or the in-game time counted by the computer-implemented counter satisfies an update condition determined in advance in the battle game, a replacement process including a process of erasing all player's units placed on the battle field while maintaining a position of the enemy unit on the battle field, and a process of placing a player's unit included in a second player's group among the plurality of player's groups on the battle field, and
the player's unit and the enemy unit after the replacement process are caused to battle against each other in accordance with the positional relationship on the battle field.

2. The non-transitory computer-readable storage medium having stored therein the information processing program according to claim 1, wherein
when all battle units placed on the battle field perform actions, the computer-implemented counter counts a single turn.

3. The non-transitory computer-readable storage medium having stored therein the information processing program according to claim 1, wherein
when all the player's units placed on the battle field of the first player's group perform actions, the computer-implemented counter counts a single turn.

4. The non-transitory computer-readable storage medium having stored therein the information processing program according to claim 1, wherein
a first battle unit attacks a second battle unit in the battle game, thereby changing a first parameter of the second battle unit, and upon the first parameter of the second battle unit satisfying a first parameter condition, the computer erases the second battle unit from the battle field.

5. The non-transitory computer-readable storage medium having stored therein the information processing program according to claim 1, wherein
if the update condition is satisfied, the player's unit included in the second player's group is placed at or near an appearance position determined in advance on the battle field.

6. The non-transitory computer-readable storage medium having stored therein the information processing program according to claim 5, wherein
when the player's unit included in the first player's group is first placed on the battle field, the player's unit is placed at or near the appearance position.

7. The non-transitory computer-readable storage medium having stored therein the information processing program according to claim 4, wherein
if at least one defense unit is placed on the battle field and the update condition is satisfied, the placement of the at least one defense unit on the battle field is continued by maintaining a position of the defense unit at a time when the update condition is satisfied, and
the battle unit attacks the defense unit in the battle game, thereby changing a second parameter of the defense unit, and if the second parameter satisfies a second parameter condition regarding the at least one defense unit placed on the battle field, the computer ends the battle game.

8. The non-transitory computer-readable storage medium having stored therein the information processing program according to claim 7, wherein
if the update condition is satisfied, the player's unit included in the second player's group is placed at or near the position of the defense unit.

9. The non-transitory computer-readable storage medium having stored therein the information processing program according to claim 7, wherein
the position of the defense unit on the battle field is fixed.

10. The non-transitory computer-readable storage medium having stored therein the information processing program according to claim 4, further causing the computer to execute
calculating a score in the battle game, wherein
upon the update condition being satisfied, the computer determines the score in accordance with a number of player's units placed on the battle field immediately before the replacement process is performed, and every time the update condition is satisfied, the score is accumulated.

11. The non-transitory computer-readable storage medium having stored therein the information processing program according to claim 7, further causing the computer to execute
calculating a score in the battle game, wherein
upon the second parameter of the defense unit satisfies the second parameter condition, the computer disables the defense unit on the battle field, and
when the battle game ends, the computer calculates a score in accordance with a number of defense units remaining enabled on the battle field.

12. The non-transitory computer-readable storage medium having stored therein the information processing program according to claim 10, wherein
the score is determined in accordance with a number of enemy units erased from the battle field in the battle game.

13. The non-transitory computer-readable storage medium having stored therein the information processing program according to claim 1, wherein
the computer receives a user specification of which of the player's groups the player's unit is included.

14. The non-transitory computer-readable storage medium having stored therein the information processing program according to claim 1, wherein
in accordance with a number of elapsed turns or a lapse of the in-game time counted by the computer-implemented counter, an enemy unit is added to the battle field.

15. An information processing apparatus comprising a computer, an input device and a display providing a graphical user interface coupled to the computer, the computer configured to define a virtual space including a battle field of a battle game in response to inputs from the input device and to display the battle field on the display, the computer being further configured to execute instructions to perform operations comprising:
set a plurality of player's groups each including at least one player's unit;
place a player's unit included in a first player's group and an enemy unit on the battle field in the virtual space, the first player's group being among the plurality of player's groups;
execute the battle game where at least one of battle units including the player's unit and the enemy unit are moved on the battle field, and the player's unit and the enemy unit are caused to battle against each other in accordance with a positional relationship on the battle field; and
use a computer-implemented counter to count a number of elapsed turns or in-game time in the battle game, wherein
if the number of elapsed turns or an in-game time the computer-implemented counter counts satisfies an update condition determined in advance in the battle game, perform a replacement process to erase all player's units placed on the battle field while maintaining a position of the enemy unit on the battle field, and place a player's unit included in a second player's group among the plurality of player's groups on the battle field, and
the player's unit and the enemy unit after the replacement process are caused to battle against each other in accordance with the positional relationship on the battle field.

16. An information processing system comprising a computer and an input device and a display providing a graphical user interface coupled to the computer, the computer configured to define a virtual space including a battle field of a battle game in response to inputs from the input device and to display the battle field on the display, the computer being further configured to perform operations comprising:
set a plurality of player's groups each including at least one player's unit;
place a player's unit included in a first player's group and an enemy unit on the battle field in the virtual space, the first player's group being among the plurality of player's groups;
execute the battle game where at least one of battle units including the player's unit and the enemy unit are moved on the battle field, and the player's unit and the enemy unit are caused to battle against each other in accordance with a positional relationship on the battle field; and
use a computer-implemented counter to count a number of elapsed turns or in-game time in the battle game, wherein
if the number of elapsed turns or the in-game time counted by the computer-implemented counter satisfies an update condition determined in advance in the battle game, perform a replacement process to erase all player's units placed on the battle field while maintaining a position of the enemy unit on the battle field, and place a player's unit included in a second player's group among the plurality of player's groups on the battle field, and cause the player's unit and the enemy unit after the replacement process are caused to battle against each other in accordance with the positional relationship on the battle field.

17. An information processing method performed by a computer coupled to an input device and a display that provide a graphical user interface, the computer configured to define a virtual space including a battle field of a battle game in response to inputs from the input device and to display the battle field on the display, the method comprising:

setting a plurality of player's groups each including at least one player's unit;

placing a player's unit included in a first player's group and an enemy unit on the battle field in the virtual space, the first player's group being among the plurality of player's groups;

executing the battle game where at least one of battle units including the player's unit and the enemy unit are moved on the battle field, and the player's unit and the enemy unit are caused to battle against each other in accordance with a positional relationship on the battle field; and using a computer-implemented counter to count a the number of elapsed turns or in-game time in the battle game, wherein if the number of elapsed turns or the in-game time counted by the computer-implemented counter satisfies an update condition determined in advance in the battle game, perform a replacement process including erasing all player's units placed on the battle field while maintaining a position of the enemy unit on the battle field, and placing a player's unit included in a second player's group among the plurality of player's groups on the battle field, and the player's unit and the enemy unit after the replacement process are caused to battle against each other in accordance with the positional relationship on the battle field.

* * * * *